United States Patent [19]

Mysels

[11] 4,073,834

[45] Feb. 14, 1978

[54] METHOD OF MAKING NUCLEAR FUEL ELEMENTS

[75] Inventor: Karol J. Mysels, La Jolla, Calif.

[73] Assignee: General Atomic Company, San Diego, Calif.

[21] Appl. No.: 555,688

[22] Filed: Mar. 5, 1975

[51] Int. Cl.² .............................................. G21C 21/00
[52] U.S. Cl. ...................................... 264/0.5; 176/89
[58] Field of Search .............................. 264/.5; 176/89

[56] References Cited

U.S. PATENT DOCUMENTS

| 3,102,047 | 8/1963 | Rivington | 264/.5 |
|---|---|---|---|
| 3,166,614 | 1/1965 | Taylor | 264/.5 |
| 3,438,858 | 4/1969 | Howard et al. | 264/.5 |
| 3,492,379 | 1/1970 | Redding | 264/.5 |
| 3,558,750 | 1/1971 | Davis et al. | 264/.5 |

*Primary Examiner*—Benjamin R. Padgett
*Assistant Examiner*—David Leland
*Attorney, Agent, or Firm*—Fitch, Even, Tabin & Luedeka

[57] ABSTRACT

A nuclear fuel element is fabricated from a porous graphite block containing a plurality of open coolant passageways and a plurality of fuel chambers uniformly located therebetween. The fuel chambers are filled with nuclear fuel material and closed. The entire porous block is then impregnated with a liquid carbonizable impregnant which penetrates through the septa and into each of the fuel chambers, wherein it is cured and then carbonized in situ. The resulting carbon residue integrally binds the nuclear fuel material to the fuel chamber walls of the porous grahite block and provides excellent heat transfer from the fuel to the walls of the open passageways from which the heat is extracted by the coolant.

12 Claims, No Drawings

METHOD OF MAKING NUCLEAR FUEL ELEMENTS

BACKGROUND OF THE INVENTION

This invention relates to making nuclear fuel elements and more particularly to making fuel elements from blocks of graphite having a plurality of fuel chambers as well as a plurality of coolant passageways.

Graphite not only exhibits good structural properties under high-temperature and fast-neutron irradiation conditions, but it is valuable as a moderator in reducing the velocity of fast neutrons. As a result, various nuclear reactors utilize fuel elements made of graphite wherein individual fuel pellets or rods are disposed. One such type of fuel element particularly designed for use in a high-temperature, gas-cooled nuclear reactor is shown in U.S. Pat. No. 3,413,196, issued Nov. 26, 1968.

At one time, it was contemplated that the fuel chambers in such fuel elements could be filled with loose particles of nuclear fuel; however, for safety reasons, it has been decided that the fuel must be bonded together as a cohesive mass so as to prevent its being spread throughout the reactor core should an unforeseen accident occur that might result in rupture of one of the graphite blocks. Different methods of bonding the fuel together have been used; for example, fuel chambers in a graphite block might be filled with a paste-like mixture of coated nuclear particles, a filler such as graphite powder and a binder such as coal tar pitch, by injecting the mixture into the fuel chambers and carbonizing it in situ. Alternatively, individual fuel rods or pellets are often formed in separate molds and then inserted into the fuel chambers either prior to or subsequent to carbonizing. However, both of these methods have had some drawbacks. When fuel elements made in the former manner are exposed to prolonged, fast neutron irradiation, the graphite fuel block shrinks substantially more than the pitch-bonded coated fuel particles, often causing cracking to occur in the structure of the graphite fuel element body. Moreover, if the binder adheres too strongly to the nuclear fuel particle coatings and the binder shrinks substantially more than the coating material, particles may be pulled against one another and ultimately cracked open.

Prospective damage to the nuclear fuel element body as a result of irradiation shrinkage can be avoided by using separate fuel pellets or rods that are unbonded to the interior surfaces of the fuel chambers, which fuel pellets are fabricated separately and then inserted into the chambers. However, this procedure generally requires a gap between the fuel pellet or rod and the interior surface of the fuel chamber, resulting in a considerable penalty in thermal conductivity across this gap in the operating reactor, plus the need to prefabricate the rods or pellets before assembly of the fuel elements. The thermal conductivity penalty is even greater because of the need to allow for manufacturing tolerances, which results in most gaps being slightly larger than needed just to slip the pellets into the fuel chambers. Improvements in the fabrication of nuclear fuel elements of this general type have continuously been sought after.

SUMMARY OF THE INVENTION

It has been found that by fabricating nuclear fuel element bodies from nearly isotropic graphite, which will exhibit only a 1 to 2 percent shrinkage under high temperature and fast neutron irradiation conditions, nuclear fuel materials in particulate form can be introduced loosely into the fuel chambers, and after plugging the openings to the fuel chambers, the entire graphite fuel element can be immersed in an organic impregnant. The impregnant chosen has a suitable viscosity so that it will penetrate through the walls or septa dividing the coolant passageways from the fuel chambers and uniformly wet the loose bed of fuel material. Once penetration is complete, the impregnant is cured and carbonized in situ within the fuel element, and the remaining char or carbonized residue forms a matrix that bonds the loose fuel into a cohesive mass as well as reduces the porosity of the graphite and concomitantly increases carbon content. Moreover, this method of fabrication eliminates any gap between the fuel and the fuel chamber wall, which gap would detract from heat conduction, by in essence providing a direct path for heat conduction from the fuel all the way through the septa of the graphite fuel element. The elimination of the need for molding individual fuel pellets or rods and maintaining an inventory of these items also results in a substantial saving in fabrication costs of the nuclear fuel elements.

DESCRIPTION OF THE PREFERRED EMBODIMENTS

Large blocks of near-isotropic graphite can be obtained from various manufacturers in the United States or can be extruded from calcined isotropic coke. Near-isotropic graphite is defined by the ratio of its physical properties, particularly the coefficient of thermal expansion, in the direction parallel to its direction of extrusion as compared to the same property in the direction perpendicular to the extrusion direction. In the near-isotropic graphite which is employed, the coefficient of thermal expansion in the direction perpendicular to extrusion direction should be less than 1.5, and preferably less than 1.2, times the coefficient of thermal expansion in the direction parallel to extrusion. Graphite meeting this criterion is available as Great Lakes Carbon Grade H-451, as Union Carbide No. TS-1240, and as Airco Spear No. SO-818. The graphite has a density of about 1.76 g/cm$^3$ and will have a gas permeability to helium, at room temperature, of about 10$^3$cm$^2$/sec.

The fuel element body itself may take various size characteristics; however, one representative fuel element is that of a hexagonal block standing about 80 centimeters high and measuring about 36 centimeters across the flats. A hexagonal block of this size may include as many as about 108 coolant passageways each about 1.6 centimeters in diameter extending completely through the block from face-to-face. Uniformly located around and between these coolant passageways would be some 210 fuel chambers, which may be about 1.24 centimeters in diameter, in the form of holes which extend from the upper face down to a location near the bottom. All of the coolant passageways and the fuel chambers are preferably parallel to one another. As a result of this construction, the septa or walls of graphite between fuel chambers and coolant passageways measure about 0.45 centimeter at their narrowest point.

The nuclear fuel material may be cores or kernels of fissile and/or fertile material, e.g., uranium and/or thorium carbides or oxides, each of which is encased within a separate fission-product-retaining shell. Usually, the outermost layer of the protective shell or coating will be dense pyrocarbon, and interior thereof may be other layers of spongy pyrocarbon, as well as carbides, such as silicon, zirconium or niobium carbide. Coated fuel particles are used which are less than two millimeters in size, and spheroids not greater than about 1000 microns in diameter are preferred. The art of coating minute fuel kernels is well developed, and the precise arrangement of the pyrocarbon and/or carbide layers that constitute the nuclear fuel particles forms no part of the present invention.

In a large nuclear reactor, the density of the fuel loading will vary from one region in the core to another region; and thus, it becomes necessary to fill the fuel chambers of different fuel elements with varying amounts of fissile and/or fertile materials. Generally, the difference in loading is most efficiently achieved by mixing the coated nuclear fuel particles with particulate carbon, preferably graphite, of about the same particle size which is referred to as "shim" material. By varying the ratio of particulate graphite and fuel, a relatively homogeneous dispersion can be obtained which will achieve substantially any density of fuel loading desired while maintaining uniformity of fuel distribution within the actual fuel chambers. Usually, the fuel loading will be constant throughout the fuel chambers of a given fuel element, and accordingly a batch of coated fuel particles and graphite shim material of the desired ratio can be blended for filling all of the fuel chambers of a given fuel element. In addition, finely powdered graphite, having a size less than about one-third of the size of the graphite shim material, is preferably used as a filler to occupy portions of the spaces between fuel and shim particles. The presence of graphite helps to increase the thermal conductivity of the fueled region, contributes to moderation, reduces the amount of impregnant needed and ultimately results in a finer distribution of porosity when the impregnant or binder shrinks during curing and carbonization. The amount of graphite powder added should be such that it can be accommodated in the interstices of the fuel particle — shim particle mixture, and it preferably is not added in such an amount that it would expand significantly the packed bed of fuel and shim particles.

Usually, vibration compaction or the like is employed so as to assure that the individual fuel chambers are filled to their desired capacity. Following filling with the fuel mixture, graphite plugs are secured to close the upper end of each chamber, and the fuel element is ready for impregnation.

An organic impregnant is chosen which has a viscosity low enough to penetrate through the septa and fill the interstices of the heretofore loose mixture of fuel, particulate graphite shim material and graphite powder in the fuel chambers. The impregnant is cured to a solid state, usually by polymerization, and it is ultimately carbonized under high-temperature conditions to drive off all volatile matter and leave a substantially carbonaceous residue or char. Impregnation is usually carried out in the generally accepted fashion by initially outgassing the fuel-filled block and a bath of liquid impregnant and then submersing the block in the bath and subjecting both to atmospheric or slightly greater than atmospheric pressure. Following impregnation, the block is allowed to drain and preferably wiped thoroughly so as to remove any of the liquid impregnant adhering to the outer surfaces thereof, and thereafter curing of the impregnant is carried out, usually by slow heating.

It is important to choose an impregnant which will not exude or bleed from the pores into the coolant passageways, the result of which would be to leave undesirable residue on the walls of the passageways and perhaps require that they be reamed before using. The preferred impregnant is a low molecular weight furan polymer, based on furfuryl alcohol, preferably one which is relatively free of the monomer, e.g., less than 20 weight percent thereof. Usually about 2 to 5 percent of a catalyst, such as maleic anhydride or dimethyl maleate, is included to promote the curing of the impregnant. Other impregnants which might be used include phenolformaldehyde prepolymers, epoxy resins and epoxy prepolymers, as well as mixtures of the foregoing with each other or with coal tar pitch or a similar extender. Impregnation is carried out at a temperature at which the impregnant is fluid and has a long pot life. Preferably furan oligomers constituted by more than 50 weight percent of polymers containing less than 50 carbon atoms per molecule are used, and a temperature not more than about 50° C., and preferably room temperature, is employed. The viscosity of the impregnant at the temperature at which it is employed should be between about 100 and about 5000 cps., preferably between about 500 and 1500 cps., and a small amount of a suitable organic solvent may be added to obtain the desired viscosity.

After curing is complete, the impregnated graphite block is transferred to an oven for in situ carbonizing by breaking the cured polymer down under high heat, driving off the hydrogen and oxygen components thereof and leaving a substantially carbonaceous residue or char. The fuel element may reach 1200° C. or higher during the carbonizing process; however, during the temperature range in which most of the decomposition occurs, i.e., about 200° to about 800° C., the temperature is raised relatively slowly, e.g., at rates of 25° to 50° C. per hour.

Testing of the fuel elements under simulated reactor conditions shows excellent resistance to irradiation damage and very good thermal conductivity. The relatively low irradiation shrinkage of the near-isotropic graphite obviates the earlier-encountered problems of cracking at the regions of the fuel chamber walls, where bonding would occur with premolded fuel compacts. Examination of irradiated fuel in the fuel chambers shows that the penetrating impregnant establishes a sufficiently good bond to form the coated fuel particles, the graphite shim material and the powdered graphite into a cohesive mass, and the absence of cracked fuel particle coatings shows that the bonding is not so strong as to undesirably create stresses at the outer surfaces of the coatings that would result in cracking.

The following Example describes the best mode presently contemplated by the inventor for carrying out the invention; however, it should be understood that the process described herein is for purposes of illustration only and is not intended to in any way limit the scope of the invention which is defined by the appended claims.

EXAMPLE

A block of Great Lakes Carbon Grade H-451 near-isotropic graphite is provided which stands 79 centimeters high and has a hexagonal shape measuring 36 centimeters across flats. The block has 72 holes, each about 2.1 centimeters in diameter, extending completely through the block from its upper face to its lower face. The holes serve as coolant passageways and are parallel to one another, being distributed in a regular pattern across the block. The block is also provided with 144 fuel chambers extending parallel to the coolant passageways, and each chamber is disposed an equal distance from three coolant passageways. The fuel chambers are about 1.6 centimeters in diameter and have a depth of about 78 centimeters.

A fuel mixture is made by blending uranium-thorium carbide fuel particles, each having a spongy carbon coating that is overcoated by a dense isotropic pyrolytic carbon coating, with particles of crushed graphite. The coated nuclear fuel particles are spheroids ranging in diameter from about 200 microns to about 850 microns, and the graphite particles are about the same size, averaging about 500 microns in size. To provide the requisite fuel loading in the fuel chambers of this fuel element, as desired for its intended location in the reactor core, a mixture is made in the ratio of about 95 parts by weight of pyrocarbon-coated nuclear fuel particles, about 5 parts per weight of shim graphite and about 15 parts by weight of graphite flour (having a maximum particle size of less than 88 microns). After a uniform blend has been achieved, the fuel chambers of the fuel element are filled with this mixture, employing vibration compaction to assure that filling to the desired extent is achieved. Following completion of the filling, circular plugs are inserted in the top of each of the fuel chambers and are suitably cemented in place with an organic cement.

The fuel filled graphite block is then transferred to a chamber designed to hold a sufficient amount of liquid to totally submerse the block. The block is first subjected to a high vacuum for about ½ hour in order to reasonably out-gas the block in its entirety. Subsequently, the chamber is filled with 97 parts by weight of a low molecular weight furan polymer (which has been similarly degassed), about 3 parts dimethyl maleate (a catalyst which promotes the completion of the polymerization reaction), and about 3 parts of isopropyl alcohol. The approximate composition of the furfuryl alcohol oligomer, as obtained by gel-permeation chromatography, expressed as weight percent is: monomer — 17.8%, dimer = 9.7%, trimer — 7.1%, tetramer — 5.7%, pentamer — 5.2%, 6 to 15-mers — 18.2%, carbon chain 15 to 50-mers — 9.3%, and polymers higher than 50-mers — 27.0%. The impregnant mixture has a viscosity of about 760 cps. at 25° C., the temperature at which the impregnation takes place, and it penetrates through the septa from the multitude of coolant passageways and enters the interstices of the fuel-graphite mixture in each of the fuel chambers. Submersion is carried out for about 6 hours at atmospheric pressure.

Upon completion of desired impregnation, the block is allowed to briefly drain, the exterior is wiped, and the coolant passageways are freed of adhering impregnant. The impregnated block is then slowly heated to about 120° C. over a period of about twelve hours. During this low heating, the polymerization of the furan is completed. Carbonizing in situ is then effected by heating the block in an inert atmosphere to raise its temperature about 90° C. per hour, until a temperature of about 1100° C. is reached. Overall, the carbonizing takes about 12 hours and breaks down the polymerized hydrocarbon, driving off the hydrogen and oxygen and leaving a substantially carbonaceous residue. Examination of a sample made in this manner shows that the matrix of graphite flour and char forms a network linking the particulate fuel-graphite shim blend directly to the septa of the fuel element, thus providing an excellent path for heat flow to the surfaces of the coolant passageways while also securely bonding the fuel particles together as a cohesive mass.

The carbonized fuel element is then subjected to irradiation conditions to simulate its residence within the core of a high-temperature gas-cooled nuclear reactor.

After receiving a dosage of about $8 \times 10^{21}$ neutrons per centimeter$^3$, having an energy level greater than 0.18 MeV., at a temperature of about 1000° C., the near-isotropic graphite fuel element shrinks about 1.5 percent in the direction of extrusion without losing structural integrity. The bonding between the walls of the fuel chamber and the coated nuclear fuel particles remains good; however, there is no failure of fuel particle coatings in a manner indicative of bonding too tightly to a shrinking binder material. The fuel element is considered satisfactory because of maintenance of a cohesive bonding of the fuel mixture and because the excellent heat transfer allows the desired coolant temperature to be reached while the fuel temperature is maintained about 90° C. lower than normal.

Although the invention has been described with regard to certain preferred embodiments, it should be understood that modifications such as would be obvious to one having the ordinary skill in the art are intended to come within the scope of the invention which is defined solely by the appended claims. Various of the features of the invention are set forth in the claims which follow.

What is claimed is:

1. A method of making a nuclear fuel element, which method comprises
    providing a porous graphite block having a plurality of fuel chambers formed therein and also having a plurality of open holes for the flow of coolant therethrough,
    disposing nuclear fuel material in said fuel chambers,
    closing the nuclear fuel-containing fuel chambers,
    impregnating said nuclear-fuel-containing porous block with a liquid carbonizable impregnant under conditions which cause the impregnant to penetrate from said open holes through the walls formed by said porous block and into said closed fuel chambers so as to enter said nuclear fuel material disposed in said fuel chambers, and
    heating said impregnated block to carbonize said impregnant in situ whereby said nuclear fuel material becomes integrally bound to said porous graphite block at the interior wall surfaces of said fuel chambers thus providing excellent heat transfer therebetween.

2. A method in accordance with claim 1 wherein nuclear fuel material is provided in particulate form.

3. A method in accordance with claim 2 wherein said nuclear fuel is in the form of pyrolytic-carbon-coated particles of fissile material.

4. A method in accordance with claim 2 wherein said particulate nuclear fuel is mixed with particulate carbon shim material.

5. A method in accordance with claim 4 wherein said impregnant is an organic polymeric resin which is cured to unite said mixture of nuclear fuel and shim material prior to carbonization.

6. A method in accordance with claim 4 wherein said mixture of nuclear fuel and shim material also includes graphite powder of a size substantially smaller than either said nuclear fuel or shim material.

7. A method in accordance with claim 1 wherein said coolant holes are generally parallel to one another and extend through said block from surface to surface.

8. A method in accordance with claim 1 wherein said graphite block is formed of near-isotropic graphite.

9. A method in accordance with claim 8 wherein said near-isotropic graphite has a coefficient of thermal expansion parallel to the direction of extrusion less than 1.2 times that in the direction perpendicular thereto.

10. A method in accordance with claim 5 wherein said graphite block contains a plurality of generally parallel coolant holes and elongated fuel chambers which are located so that said fuel chambers are each surrounded by at least three adjacent coolant holes, and wherein the ends of said fuel-containing chambers are closed prior to said impregnation.

11. A method in accordance with claim 10 wherein said impregnation is carried out by submersion in a reservoir of said organic liquid and wherein said impregnant is a furan compound having a viscosity between about 500 cps. and 1500 cps. at 25° C.

12. A method in accordance with claim 5 wherein said organic liquid is a furfuryl alcohol oligomer containing less than 20 weight percent monomer and more than 50 weight percent of polymers containing less than 50 carbon atoms.

* * * * *